73032

Chas. E Palmer's Impd Steam Trap

PATENTED
JAN 7 1868

Witnesses
Richard J. P. Goodwin
William R Patten

Inventor.
Charles E. Palmer
Manchester
N.H.

United States Patent Office.

CHARLES E. PALMER, OF MANCHESTER, NEW HAMPSHIRE.

Letters Patent No. 73,032, dated January 7, 1868.

IMPROVEMENT IN STEAM-TRAPS.

The Schedule referred to in these Letters Patent and making part of the same.

TO ALL WHOM IT MAY CONCERN:

Be it known that I, CHARLES E. PALMER, of Manchester, in the county of Hillsborough, and State of New Hampshire, have invented a new and useful Improvement in Steam-Traps; and I do hereby declare that the following is a clear and exact description thereof, which will enable others skilled in the art to make and use the same, reference being had to the accompanying drawings, forming a part of this specification, in which—

Similar letters of reference indicate like parts.

This invention relates to a steam-trap having a movable valve-seat, held in position by means of a partitioned coupling screwed to the end of the escape-pipe, and tapped to receive through its partition the shank of the valve-seat.

Figure 2:
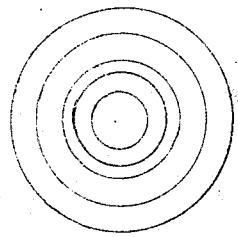
Figure 2 represents an end elevation of the coupling and valve-seat.
Figure 3:
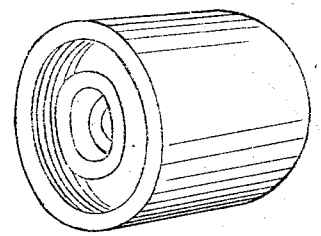
Figure 3 represents a side elevation of the same.
Figure 4:
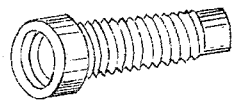
Figure 4 represents a side and partial end elevation of the valve-seat.
Figure 1:
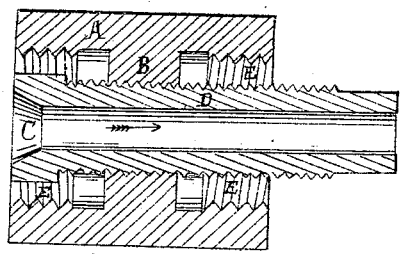
Figure 1 represents a plan or inside view of this invention.

The invention consists, first, in a partitioned coupling, fig. 1, A B, constructed of composition or other metal, which resists the oxidizing action of water and steam, with its partition tapped through its centre, to permit the passage of the valve-seat shank D; second, the devices for regulating the valve by means of a movable seat, C, with its shank D passing through the partition B, fitting it closely by means of a screw-thread, which enables it to be easily advanced towards the valve, or withdrawn from it.

Having thus described my invention, I claim as new, and desire to secure by Letters Patent—

The movable valve-seat C, constructed with a partitioned coupling, A B, substantially as set forth.

The above specification of my invention signed by me, this eleventh day of October, A. D. 1867.

CHARLES E. PALMER.

Witnesses:
RICHARD J. P. GOODWIN,
WILLIAM R. PATTEN.